(12) United States Patent
Chen et al.

(10) Patent No.: US 11,173,493 B2
(45) Date of Patent: Nov. 16, 2021

(54) ADAPTIVE AND RAPID REPAIRING DEVICE FOR SINGLE ROLLER

(71) Applicants: Nanchang Hangkong University, Nanchang (CN); Fangda Special Steel Technology Co., Ltd., Nanchang (CN)

(72) Inventors: Yuhua Chen, Nanchang (CN); Timing Zhang, Nanchang (CN); Jinyang Hu, Nanchang (CN); Shuchun Yuan, Nanchang (CN); Shanlin Wang, Nanchang (CN); Yongde Huang, Nanchang (CN); Yutian Xie, Nanchang (CN); Tao Chen, Nanchang (CN)

(73) Assignees: Nanchang Hangkong University, Nanchang (CN); Fangda Special Steel Technology Co., Ltd., Nanchang (CN)

( * ) Notice: Subject to any disclaimer, the term of this patent is extended or adjusted under 35 U.S.C. 154(b) by 117 days.

(21) Appl. No.: 16/705,671

(22) Filed: Dec. 6, 2019

(65) Prior Publication Data
US 2020/0290053 A1    Sep. 17, 2020

(30) Foreign Application Priority Data
Mar. 14, 2019    (CN) .......................... 201910192060.0

(51) Int. Cl.
*B23K 37/00*    (2006.01)
*B02C 4/30*    (2006.01)
*B23K 37/02*    (2006.01)

(52) U.S. Cl.
CPC ............ *B02C 4/30* (2013.01); *B23K 37/0229* (2013.01); *B23K 37/0241* (2013.01); *B23K 37/0247* (2013.01); *B23K 37/0282* (2013.01)

(58) Field of Classification Search
CPC ............ B23K 37/0229; B23K 37/0241; B23K 37/0247; B23K 37/0282
See application file for complete search history.

(56) References Cited

U.S. PATENT DOCUMENTS

| | | | |
|---|---|---|---|
| 10,556,308 B2* | 2/2020 | Nose | B23Q 1/5456 |
| 10,599,127 B2* | 3/2020 | Spieker | B25J 11/005 |
| 2016/0114418 A1* | 4/2016 | Jones | B23K 9/1274 219/124.1 |
| 2016/0244083 A1* | 8/2016 | Chen | B62B 3/1424 |
| 2019/0262928 A1* | 8/2019 | Kishikawa | B25J 13/08 |
| 2019/0283166 A1* | 9/2019 | Clark | B23K 10/027 |

* cited by examiner

*Primary Examiner* — Erin B Saad
(74) *Attorney, Agent, or Firm* — Arent Fox LLP; Michael Fainberg

(57) ABSTRACT

The present invention discloses an adaptive and rapid repairing device for single roller, which includes a working module and a mechanical arm module, which are fixedly connected, where the mechanical arm module is connected with a movable module; the working module includes a supporting frame, symmetrical dovetail grooves are opened in two sides of the supporting frame, the dovetail grooves are movably connected with four sliding supports symmetrically arranged along the supporting frame; a connecting rod support penetrates the two through holes opened in the top of the sliding support, the top end of the connecting rod support is hinged with a long connecting rod; the supporting frame is provided with a worm gear mounting support, the worm gear mounting support is equipped with worm gears and worms through rotating shafts, and the worm is fixedly connected with an output shaft of a worm motor.

9 Claims, 4 Drawing Sheets

ADAPTIVE AND RAPID REPAIRING DEVICE FOR SINGLE ROLLER

CROSS-REFERENCE TO RELATED APPLICATIONS

This application claims priority to Chinese Patent Application No. 201910192060.0 filed on Mar. 14, 2019, the entire contents of which is hereby incorporated by reference.

TECHNICAL FIELD

The present invention relates to the field of single roller repair technologies, and in particular, to an adaptive and rapid repairing device for single roller.

BACKGROUND

Application of a crusher is wide, but a single roller as a key part of the crusher is prone to wear, and a currently generally utilized single roller repairing method is to conduct surfacing repair on teeth of the single roller. The existing single roller teeth repair process has problems of complicated and numerous working procedures, unreasonable selection of process parameters and the like such that efficiency of single roller surfacing repair is very low, the quality of products is not high, and roller teeth is prone to generate bending deformation to influence the use due to the fact that the roller teeth is unevenly heated.

SUMMARY

An objective of the present invention is to provide an adaptive and rapid repairing device for single roller, which symmetrically heats two side faces of roller teeth during repairing so as to prevent the roller teeth from bending during the repairing, in order to solve the problems in the prior art.

To achieve the above objective, the present invention provides the following solution.

The present invention provides an adaptive and rapid repairing device for single roller, including: a working module and a mechanical arm module, which are fixedly connected, where the mechanical arm module is connected with a movable module through meshing of a gear and a rack; the working module includes a supporting frame, symmetrical dovetail grooves are opened in two sides of the supporting frame, the dovetail grooves are movably connected with four sliding supports symmetrically arranged along the supporting frame, and the bottoms of the sliding supports are connected with welding guns; two through holes are opened in the top of the sliding support, a connecting rod support penetrates the through holes, and the top end of the connecting rod support is hinged with a long connecting rod; the supporting frame is provided with a worm gear mounting support, the worm gear mounting support is equipped with worm gears through rotating shafts, the worm gear is connected with a worm, and the worm is fixedly connected with an output shaft of a worm motor; the rotating shaft is concentrically and fixedly connected with a turntable, and a tail end of the long connecting rod is hinged with the turntable; and a connecting rod is hinged between the long connecting rod and the supporting frame.

Optionally, the connecting rod support has a rectangular structure, one end of the connecting rod support is hinged with the long connecting rod while the other end thereof is provided with a rectangular groove, and two side walls of the rectangular groove movably penetrate the through holes.

Optionally, two first range sensors are arranged at one end, away from the long connecting rod, of the connecting rod support.

Optionally, the mechanical arm module includes a small arm assembly, a first motor, a large arm, a second motor and a mechanical arm base; one end of the small arm assembly is fixedly connected with the working module while the other end thereof is connected with the first motor through the large arm; and the small arm assembly internally includes a movable hinge, and the large arm is connected with the mechanical arm base through the second motor.

Optionally, the movable module includes a rack, the ground rail, a third motor, a ground rail pressing block and second range sensors; and the rack is fixedly connected with the ground rail, the third motor is fixedly mounted on the mechanical arm base, an output shaft of the third motor is in contact matching with the rack through a gear, and the second range sensors are mounted at two ends of the ground rail.

Optionally, the first range sensors are respectively located on two sides of the welding gun, and the first range sensor can change a distance between the first range sensor and the welding gun in a vertical direction.

Optionally, flanges inclined upwards are symmetrically arranged at two ends of the worm gear mounting support, a holding rod is mounted at the tail end of the flange, and one end of the connecting rod is hinged with the holding rod while the other end thereof is hinged with the long connecting rod.

Optionally, a slider is connected with the top of the sliding support, one end of the slider is movably arranged in the dovetail groove, and the through holes are opened in the slider.

Optionally, the sliding support and the slider are integrated.

Compared with the prior art, the present invention achieves the following technical effects:

the adaptive and rapid repairing device for single roller provided by the present invention has a simple structure and is convenient to use, and the working module can simultaneously conduct surfacing repair on two surfaces of the roller teeth so as to effectively prevent the roller teeth from generating thermal deformation. The working module is provided with four groups of components which can simultaneously drive the four welding guns to simultaneously work so as to greatly improve repairing efficiency. The range sensors are arranged around the welding guns to be capable of detecting to-be-repaired paths and repaired surfaces and adjusting repair process parameters in real time so as to obtain an ideal repair layer.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

Figure 1:
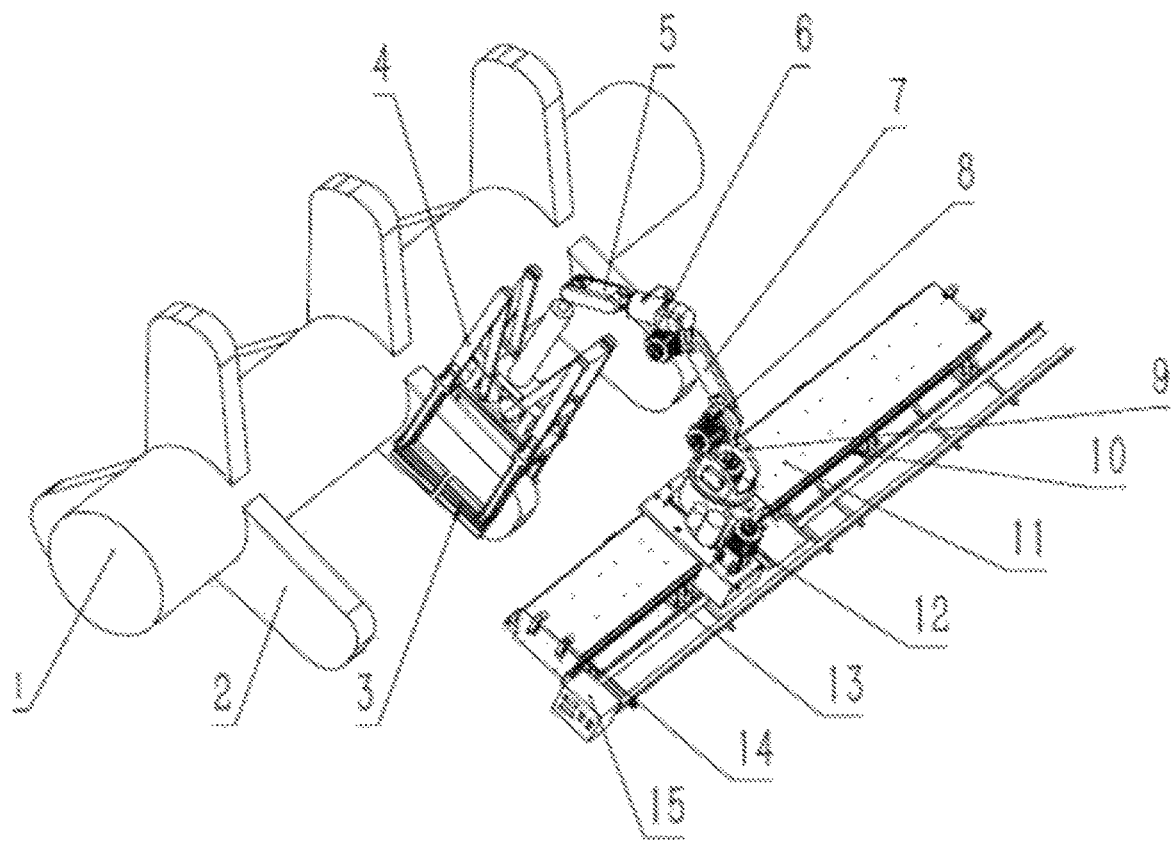
FIG. 1 is a schematic diagram showing a whole structure of an adaptive and rapid repairing device for single roller provided by the present invention.

In the drawings: 1—single roller, 2—roller teeth, 3—repair layer, 4—working module, 5—small arm assembly, 6—first motor, 7—large arm, 8—second motor, 9—mechanical arm base, 10—rack, 11—ground rail, 12—third motor, 13—ground rail pressing block, 14—second range sensor, 15—control center, 16—sliding support, 17—connecting rod support, 18—connecting rod, 19—long connecting rod, 20—turntable, 21—supporting frame, 21A—dovetail groove, 21B—worm gear mounting support, 22—worm motor, 23—welding gun, 24—first range sensor, 25—rotating shaft, 26—worm gear, and 27—worm.

DETAILED DESCRIPTION

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An objective of the present invention is to provide an adaptive and rapid repairing device for single roller, which symmetrically heats two side faces of roller teeth during repairing so as to prevent the roller teeth from bending during the repairing, in order to solve the problems in the prior art.

To make the foregoing objective, features, and advantages of the present invention clearer and more comprehensible, the present invention is further described in detail below with reference to the accompanying drawings and specific embodiments.

An objective the present invention is to provide an adaptive and rapid repairing device for single roller. As shown in FIG. 1 to FIG. 5, the adaptive and rapid repairing device for single roller mainly includes a working module 4, a mechanical arm module, a movable module and a control center 15. The mechanical arm module is fixedly connected with the working module 4. The movable module is connected with the mechanical arm module by matching of a gear and a rack. Before repairing, a relative position of the working module 4 to roller teeth 2 of a single roller 1 is adjusted such that the roller teeth 2 of the single roller 1 is just located under the working module 4, and distances between two side faces of the roller teeth 2 and connecting rod supports 17 in the working module 4 are equal to ensure that the two side faces of the roller teeth 2 are symmetrically heated during repairing and to prevent the roller teeth 2 from bending during the repairing. During repairing, the working module 4 drives the welding guns 23 to conduct a reciprocating linear movement through the sliding supports 16 to evenly repair a repair layer 3, and is controlled to move upwards by the mechanical arm module. After the repair of the roller teeth 2 is completed, the movable module drives the mechanical arm module and the working module to move along a ground rail 11 through a motor 12 so as to enter a next work station.

Specifically, the working module 4 includes the sliding supports 16, the connecting rod supports 17, connecting rods 18, long connecting rods 19, turntables 20, a supporting frame 21, worm motors 22, welding guns 23, first range sensors 24, rotating shaft 25, worm gears 26 and worms 27. A worm gear mounting support 21B is arranged on the supporting frame 21, and the worm gears 26 are mounted on the worm gear mounting support 21B through the rotating shafts 25. The worm 27 is fixedly connected with an output shaft of the worm motor 22, and the rotating shaft 25 is concentrically and fixedly connected with the turntable 20. The worm motor 22 drives the turntable 20 through the worm gear 26 and the worm 27.

Figure 2:
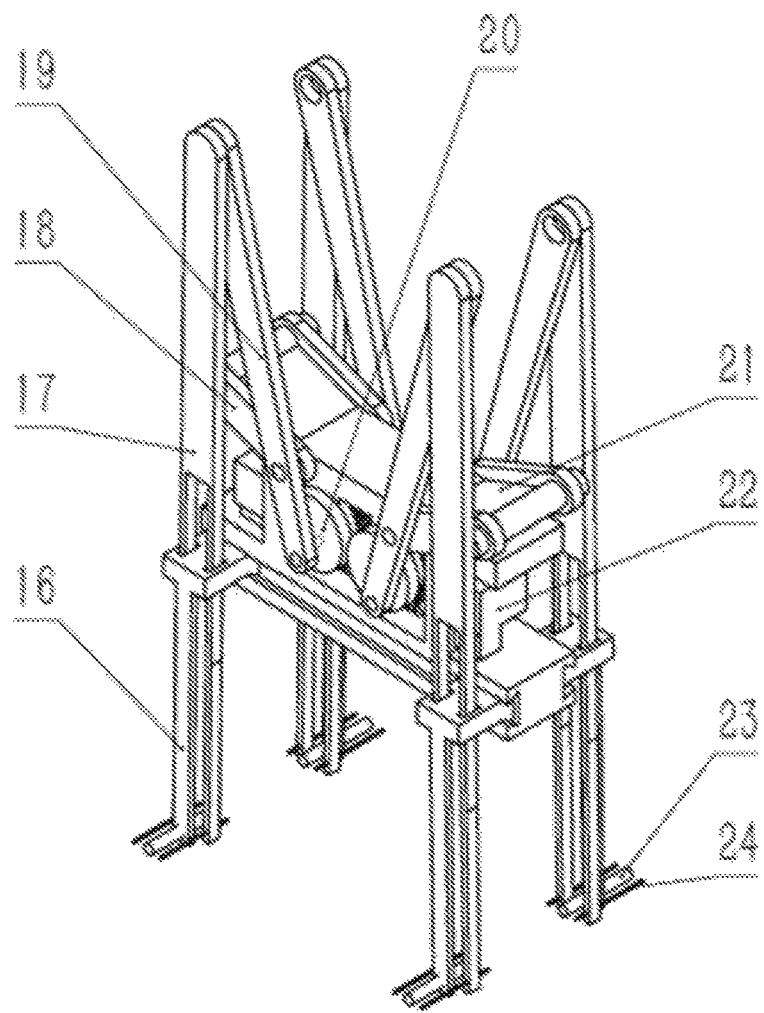
FIG. 2 is a schematic structural diagram of a working module of an adaptive and rapid repairing device for single roller provided by the present invention.
Figure 3:
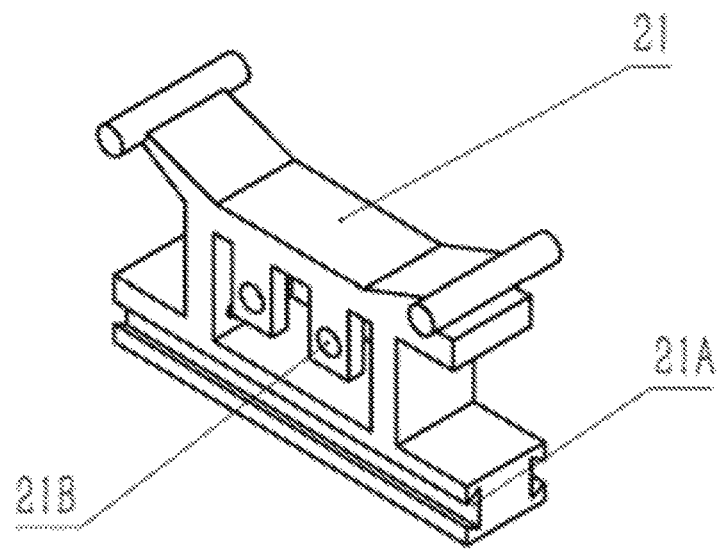
FIG. 3 is a schematic structural diagram of a supporting frame of an adaptive and rapid repairing device for single roller provided by the present invention.
Figure 4:
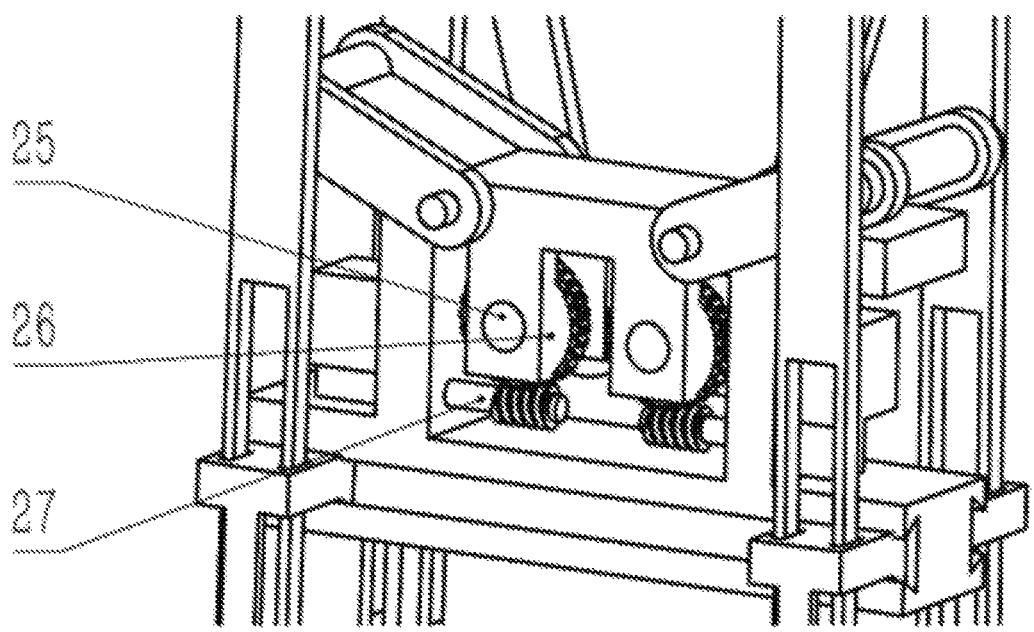
FIG. 4 is a schematic diagram showing an internal structure of a working module of an adaptive and rapid repairing device for single roller provided by the present invention.
Figure 5:
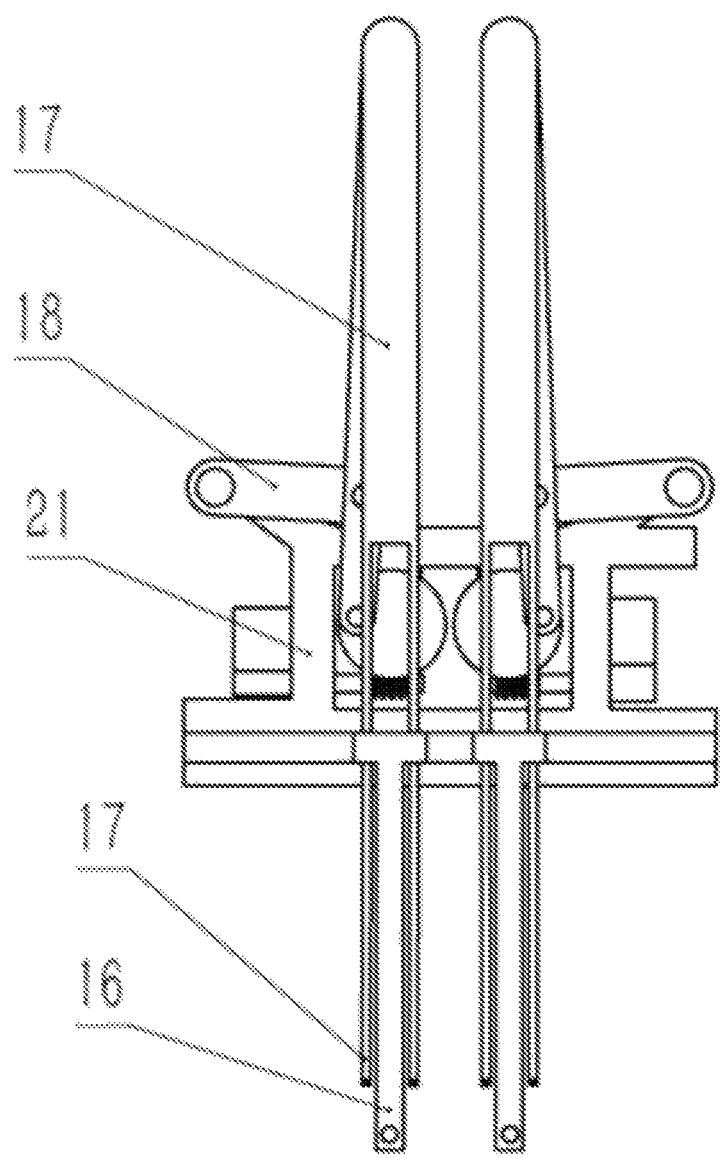
FIG. 5 is a schematic diagram showing a retraction state of connecting rod supports of a working module of an adaptive and rapid repairing device for single roller provided by the present invention.

Dovetail grooves 21A are formed in the supporting frame 21, a slider is connected with the top of the sliding support 16, one end of the slider is movably arranged in the dovetail groove 21A, through holes are opened in the slider, and the sliding support 16 and the slider are integrated such that one end of the sliding support 16 and the dovetail groove 21A are in transition fit and the sliding support 16 can freely slide in the dovetail groove 21A. The other end of the sliding support 16 is fixedly connected with the welding gun 23, and when the sliding support 16 slides in the dovetail groove 21A, the welding gun 23 can be driven to conduct a linear movement. Two through holes are formed in the slider of the sliding support 16, the connecting rod support 17 has a rectangular structure, one end of the connecting rod support 17 is hinged with the long connecting rod 19 while the other end thereof is provided with a rectangular groove, and two side walls of the rectangular groove movably penetrate the through holes such that the connecting rod support 17 penetrates the through holes in a closely clinging state. When one end of the connecting rod support 17 conducts an arc movement, the sliding support 16 can be driven to slide along the dovetail groove 21A. The long connecting rod 19 is arranged between the connecting rod support 17 and the turntable 20, the connecting rod 18 is arranged between the long connecting rod 19 and the supporting frame 21, and due to transmission relationship between the connecting rod 18 and the long connecting rod 19, the sliding support 16 can be driven to conduct the reciprocating linear movement when the turntable 20 rotates. FIG. 2 shows a greatest distance between two sliding supports 16, and FIG. 5 shows a smallest distance between the two sliding supports 16.

Two first range sensors 24 are arranged at one end of the connecting rod support 17. When the connecting rod support 17 drives the sliding support 16 to conduct a reciprocating movement, the connecting rod support 17 conducts an up and down movement such that the first range sensors 24 can swing within a certain range in a vertical direction based on the welding gun 23. The left side and the right side of each welding gun 23 are respectively provided with one range sensor 24 such that a repaired surface and a to-be-repaired path can be monitored in real time. After data detected by the first range sensors 24 is transmitted to the control center 15, the control center 15 adjusts repair process parameters in real time so as to obtain an ideal repair layer.

The mechanical arm module includes a small arm assembly 5, a first motor 6, a large arm 7, a second motor 8 and a mechanical arm base 9. One end of the small arm assembly 5 is fixedly connected with the working module while the other end thereof is connected with the large arm 7 through the first motor 6. The small arm assembly 5 internally includes a movable hinge, and during repairing, the movable hinge can ensure that the working module is in a vertical state. The large arm 7 is connected with the mechanical arm base 9 through the second motor 8. Due to cooperation of the first motor 6 and the second motor 8, the working module can be driven to conduct the reciprocating linear movement at a certain speed in a vertical plane so as to meet repairing requirements.

The movable module includes a rack 10, the ground rail 11, a third motor 12, a ground rail pressing block 13 and second range sensors 14. The rack 10 is fixedly connected with the ground rail 11, the third motor 12 is fixedly mounted on the mechanical arm base 9, an output shaft of the third motor 12 is in contact matching with the rack 10 through a gear, and under the drive of the third motor 12, the working module 4 and the mechanical arm module can conduct the reciprocating movement along the ground rail 11. The second range sensors 14 are mounted at two ends of the ground rail 11, and movement and accurate location of the working module 4 and the mechanical arm module can be achieved by the second range sensors 14.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the invention.

The invention claimed is:

1. An adaptive and rapid repairing device for a single roller, comprising:
a working module and a mechanical arm module, which are fixedly connected, wherein the mechanical arm module is connected with a movable module through meshing of a gear and a rack; the working module comprises a supporting frame, symmetrical dovetail grooves are opened in two sides of the supporting frame, the dovetail grooves are movably connected with four sliding supports symmetrically arranged along the supporting frame, and the bottoms of the sliding supports are connected with welding guns; two through holes are opened in a top of each of the sliding supports, a connecting rod support penetrates the through holes, and top end of the connecting rod support is hinged with a first connecting rod; the supporting frame is provided with a worm gear mounting support, the worm gear mounting support is equipped with worm gears through rotating shafts respectively, the worm gears are connected with worms respectively, and the worms are fixedly connected with output shafts of worm motors respectively; the rotating shafts each are concentrically and fixedly connected with a turntable, and a tail end of the first connecting rod is hinged with the turntable; and a second connecting rod is hinged between the first long connecting rod and the supporting frame.

2. The adaptive and rapid repairing device for a single roller according to claim 1, wherein the connecting rod support has a rectangular structure, one end of the connecting rod support is hinged with the first connecting rod while another end thereof is provided with a rectangular groove, and two side walls of the rectangular groove movably penetrate the through holes.

3. The adaptive and rapid repairing device for a single roller according to claim 2, wherein two first range sensors are arranged at one end, away from the first connecting rod, of the connecting rod support.

4. The adaptive and rapid repairing device for a single roller according to claim 1, wherein the mechanical arm module comprises an arm assembly, a first motor, an arm, a second motor and a mechanical arm base; one end of the arm assembly is fixedly connected with the working module while another end thereof is connected with the first motor through thearm; and the arm assembly internally comprises a movable hinge, and the arm is connected with the mechanical arm base through the second motor.

5. The adaptive and rapid repairing device for a single roller according to claim 1, wherein the movable module comprises a rack, the ground rail, a third motor, a ground rail pressing block and second range sensors; and the rack is fixedly connected with the ground rail, the third motor is fixedly mounted on the mechanical arm base, an output shaft of the third motor is in contact matching with the rack through a gear, and the second range sensors are mounted at two ends of the ground rail.

6. The adaptive and rapid repairing device for a single roller according to claim 3, wherein the first range sensors are respectively located on two sides of corresponding one of the welding guns, and the first range sensors change distances between the first range sensors and the welding guns in a vertical direction.

7. The adaptive and rapid repairing device for a single roller according to claim 1, wherein flanges inclined upwards are symmetrically arranged at two ends of the worm gear mounting support, holding rods are mounted at the tail ends of the flanges respectively, and one end of the second connecting rod is hinged with corresponding one of the holding rods while another end thereof is hinged with the first connecting rod.

8. The adaptive and rapid repairing device for a single roller according to claim 1, wherein a slider is connected with the top of each of the sliding supports, one end of the slider is movably arranged in corresponding one of the dovetail grooves, and the through holes are formed in the slider.

9. The adaptive and rapid repairing device for a single roller according to claim 8, wherein corresponding one of the sliding supports and the slider are integrated.

* * * * *